US010670795B2

(12) United States Patent
Shinohara et al.

(10) Patent No.: US 10,670,795 B2
(45) Date of Patent: Jun. 2, 2020

(54) OPTICAL STRUCTURE, LIGHT GUIDE, AND A DISPLAY DEVICE

(71) Applicant: Omron Corporation, Kyoto (JP)

(72) Inventors: Masayuki Shinohara, Kyoto (JP); Gouo Kurata, Kyoto (JP); Tsuyoshi Arai, Kyoto (JP); Norikazu Kitamura, Kyoto (JP); Yuto Mori, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/461,700

(22) PCT Filed: Nov. 24, 2017

(86) PCT No.: PCT/JP2017/042255
§ 371 (c)(1),
(2) Date: May 16, 2019

(87) PCT Pub. No.: WO2018/168093
PCT Pub. Date: Sep. 20, 2018

(65) Prior Publication Data
US 2019/0353837 A1 Nov. 21, 2019

(30) Foreign Application Priority Data
Mar. 14, 2017 (JP) .................................. 2017-049220

(51) Int. Cl.
*F21V 8/00* (2006.01)
*G02B 30/34* (2020.01)
(52) U.S. Cl.
CPC .......... *G02B 6/0036* (2013.01); *G02B 30/34* (2020.01)

(58) Field of Classification Search
CPC ..................... G02B 6/0036; G02B 27/2228
See application file for complete search history.

(56) References Cited

U.S. PATENT DOCUMENTS

| 2001/0049893 A1 | 12/2001 | Maas et al. |
| 2005/0057915 A1 | 3/2005 | Tsai |
| 2009/0046220 A1 | 2/2009 | Tsuchiya et al. |

(Continued)

FOREIGN PATENT DOCUMENTS

| JP | 2007066620 A | * | 3/2007 | ................ F21V 8/00 |
| JP | 2007-206335 A | | 8/2007 | |

(Continued)

OTHER PUBLICATIONS

International Search Report issued in Application No. PCT/JP2017/042255, dated Feb. 20, 2018 (2 pages).

(Continued)

*Primary Examiner* — Donald L Raleigh
(74) *Attorney, Agent, or Firm* — Osha Liang LLP (57) ABSTRACT

An optical structure, a light guide, and a display device can reduce an influence of diffraction and improve optical performance more than conventionally possible. A reflective pattern (10A) is an optical structure that changes a traveling direction of light and emits the light, the optical structure including: a reflective surface (20) formed of a flat surface and configured to change a traveling direction of light; and a both-end curved surface (30) formed adjacent to the reflective surface (20) and having a surface in a curved shape corresponding to a side surface of a cylinder.

9 Claims, 7 Drawing Sheets

(56) References Cited

U.S. PATENT DOCUMENTS

| | | | |
|---|---|---|---|
| 2010/0039832 A1* | 2/2010 | Ahlgren | G02B 6/0028 |
| | | | 362/613 |
| 2015/0235508 A1* | 8/2015 | Shinohara | G07F 17/3211 |
| | | | 463/31 |
| 2017/0248749 A1 | 8/2017 | Fujita et al. | |

FOREIGN PATENT DOCUMENTS

| | | | | |
|---|---|---|---|---|
| JP | 2008-84544 A | | 4/2008 | |
| JP | 2008-203633 A | | 9/2008 | |
| JP | 2008203633 A | * | 9/2008 | ............... F21V 8/00 |
| JP | 2011-232717 A | | 11/2011 | |
| JP | 5701434 B1 | | 4/2015 | |
| JP | 2015-156317 A | | 8/2015 | |
| JP | 2016-122162 A | | 7/2016 | |
| WO | 01/50444 A1 | | 7/2001 | |

OTHER PUBLICATIONS

Written Opinion issued in International Application No. PCT/JP2017/042255, dated Feb. 20, 2018 (8 pages),
Office Action in counterpart Japanese Patent Application No. 2017-049220 dated Oct. 29, 2019 (8 pages).

* cited by examiner

OPTICAL STRUCTURE, LIGHT GUIDE, AND A DISPLAY DEVICE

TECHNICAL FIELD

The present invention relates to an optical structure that changes a traveling direction of light and emits the light, a light guide including the optical structure, and a display device including the light guide.

BACKGROUND ART

There is hitherto known a technique in which light emitted from a light source is entered from the side surface of a light guide plate and reflected by a reflective pattern provided on the back-surface side of the light guide plate to emit the light from the front surface of the light guide plate.

Figure 8:
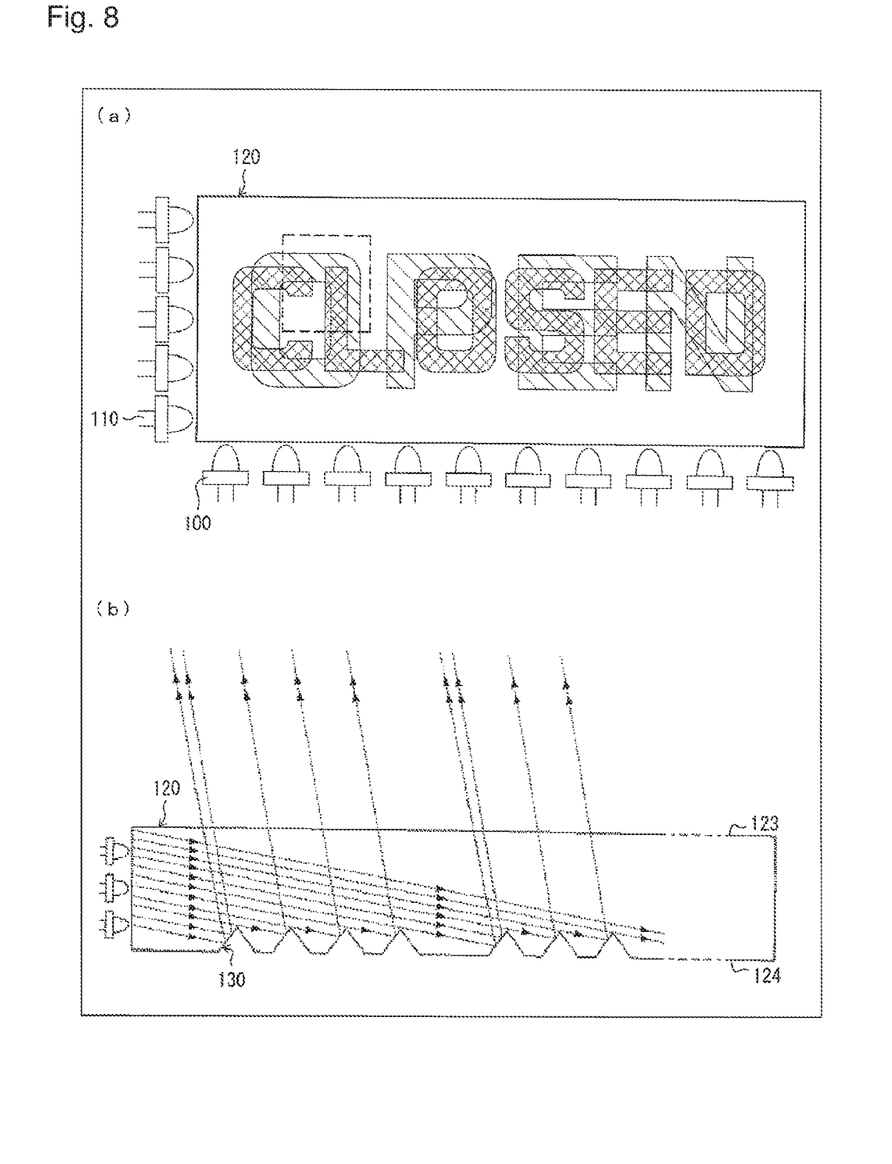
FIG. 8(a) is a plan view illustrating a conventional light guide plate.
FIG. 8(b) is a sectional view thereof.

For example, as illustrated in FIGS. 8(a) and 8(b), Patent Document 1 discloses a technique in which a triangular prism-shaped reflective pattern 130 is disposed in a region having a shape that corresponds to a predetermined character on a back surface 124 of a light guide plate 120, and light sources 100 or light sources 110 are alternatively lighted to display different characters on a front surface 123 side of the light guide plate 120.

PRIOR ART DOCUMENT

Patent Document

Patent Document 1: International Publication No. 2001/050444 (published on Jul. 12, 2001)

SUMMARY OF THE INVENTION

Problems to be Solved by the Invention

Here, the reflective pattern 130 also acts like a slit for light to diffract the light. Hence, the light reflected by the reflective surface 131 of the reflective pattern 130 is spread due to diffraction as illustrated in FIG. 9(a).

Figure 9:
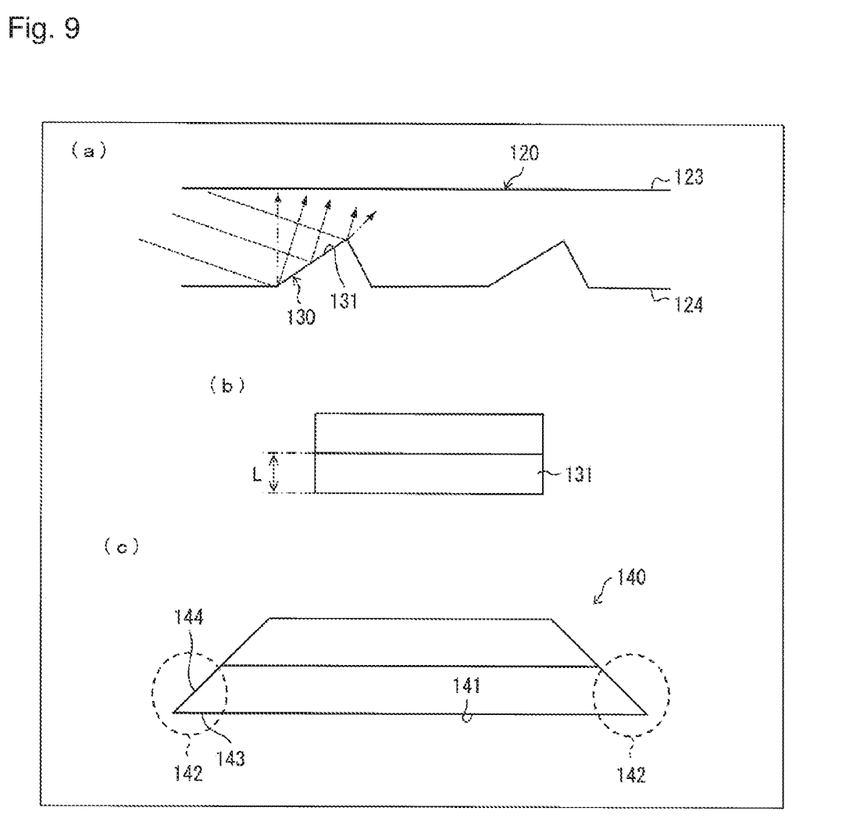
FIG. 9(a) is a sectional view illustrating the conventional light guide plate.
FIG. 9(b) is a plan view of the reflective pattern as seen from above.
FIG. 9(c) is a side view illustrating a trapezoidal prism-shaped reflective pattern

FIG. 9(b) is a plan view of the reflective pattern 130 as seen from the front surface 123 side (upper side in FIG. 9(a)). The smaller the length L in the short direction of the reflective surface 131, in other words, the smaller the pattern depth of the reflective pattern 130, the more remarkable the influence of the above diffraction.

The reflective pattern 130 having a constant length L contributes to emit discrete light with respect to an angular direction like, for example, a Bessel function by diffraction. This results in degradation in the optical performance of the reflective pattern 130. In the present specification, the "optical performance of the reflective pattern" means the performance concerning the display quality of a character, a figure, a symbol, a stereoscopic image, a projected image, and the like displayed on the front surface 123 side of the light guide plate 120. In other words, the "optical performance of the reflective pattern" means the performance concerning the light rendering properties and the image quality degree of the light guide plate 120.

The present invention has been made in view of the above problem, and an object of the present invention is to provide an optical structure, a light guide, and a light-emitting display device which can reduce an influence of diffraction and improve optical performance more than conventionally possible.

Means for Solving the Problem

In order to solve the above problems, an optical structure according to one aspect of the present invention is an optical structure that changes a traveling direction of light and emits the light, the optical structure including: a first surface formed of a flat surface and configured to change a traveling direction of light; and a second surface formed adjacent to the first surface and having a surface in a curved shape corresponding to a side surface of a cylinder.

Effect of the Invention

According to one aspect of the present invention, it is possible to provide an optical structure, a light guide, and a display device capable of reducing the influence of diffraction and improving optical performance more than conventionally possible.

MODE FOR CARRYING OUT THE INVENTION

First Embodiment

Figure 1:
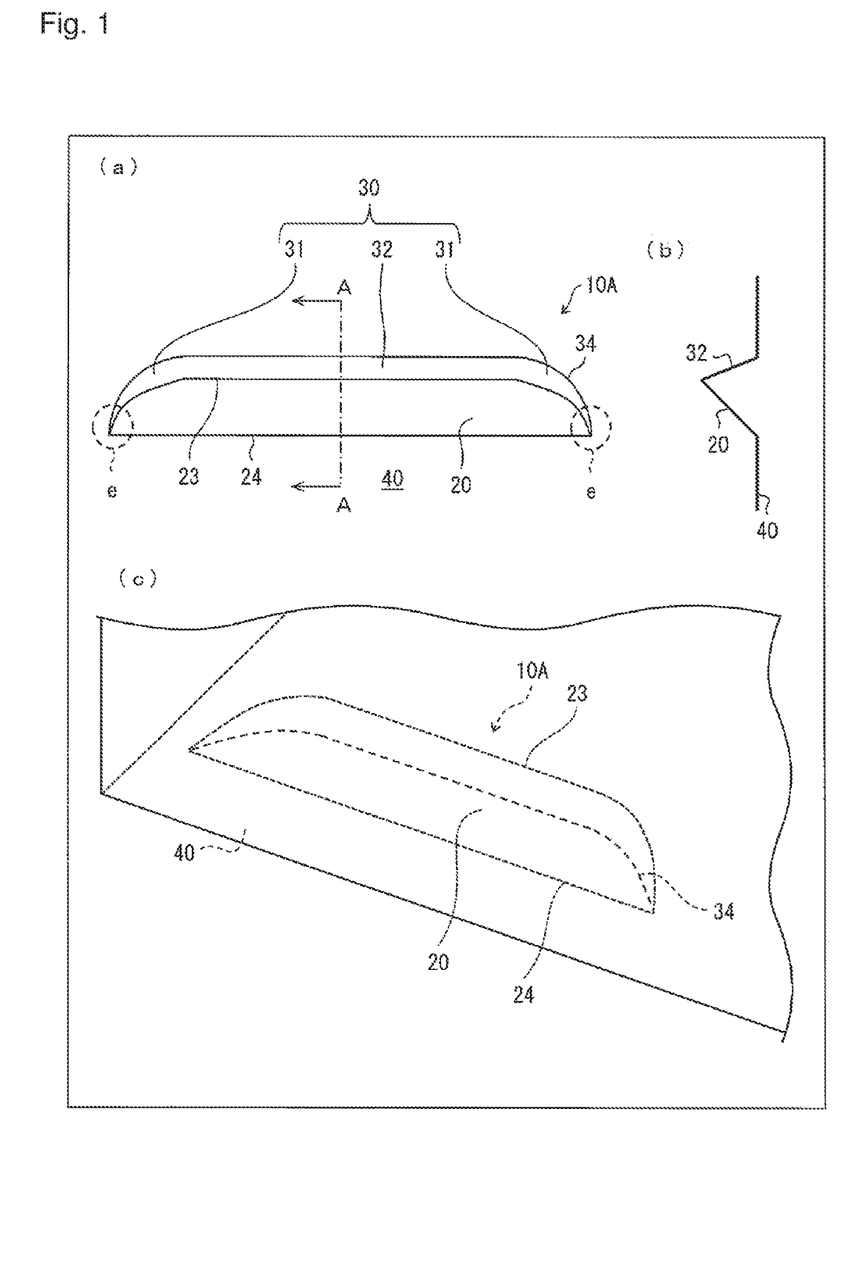
FIG. 1(a) is a plan view illustrating a configuration of a reflective pattern in a first embodiment.
FIG. 1(b) is a sectional view taken along a line A-A of (a)
FIG. 1(c) is a perspective view illustrating the configuration of the reflective pattern.

An embodiment of the present invention will be described with reference to FIGS. 1, 2, and 6. In the embodiment, as an example of an optical structure that changes a traveling direction of light and emits the light, there will be described a reflective pattern formed in a concave shape on the back surface of a light guide plate, for example. Such a light guide plate can be manufactured, for example, as follows. That is, a metal body is processed to produce a casting mold, and electroforming is performed using the produced mold. Injection molding is performed using the mold obtained by electroforming, so that the light guide plate can be formed.

<Display Device 1>

A display device 1 according to one aspect of the present invention will be described with reference to FIG. 6. FIG. 6 is a plan view illustrating the outline of the display device 1 in one aspect of the present invention.

Figure 6:
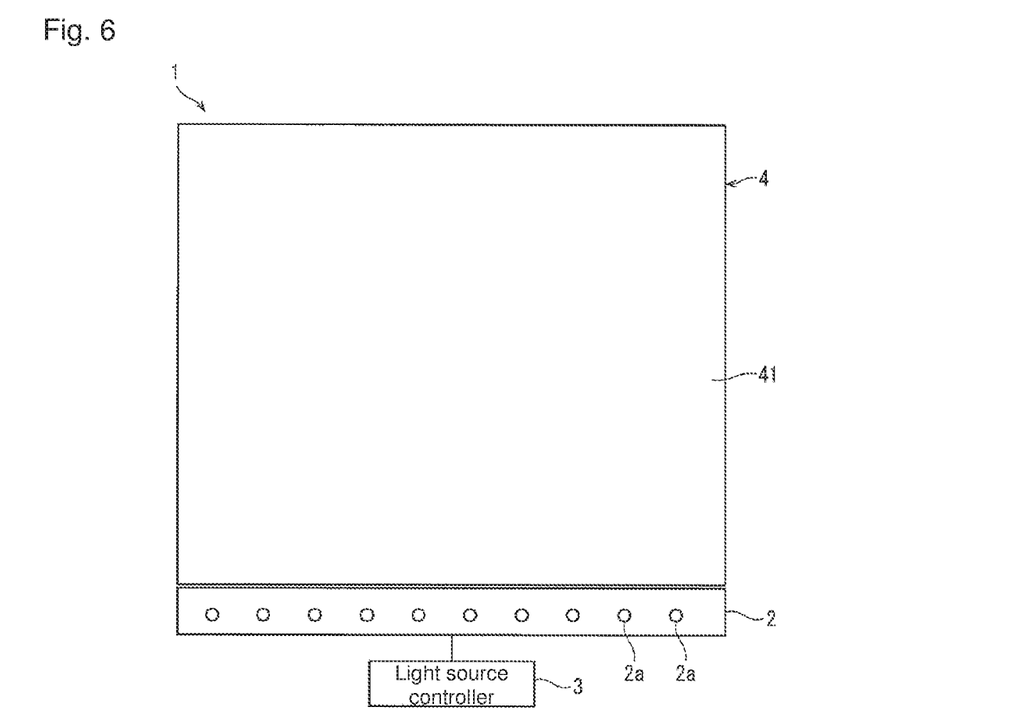
FIG. 6 is a plan view illustrating a display device in one aspect of the present invention.

As illustrated in FIG. 6, the display device 1 includes: a light source group 2 including a plurality of light sources 2a; a light guide plate (light guide) 4 that guides light having entered from the light source 2a and emits a part of the light from the light exit surface 41; and a light source controller 3 that controls the light emission state of the plurality of light sources 2a.

On the back surface of the light guide plate (light guide) 4 on the opposite side to the light exit surface 41, a plurality of reflective patterns of the embodiment are formed in a concave shape. The light having entered the light guide plate 4 from the light source 2a propagates in the light guide plate 4 while being totally reflected in the light guide plate 4, and a part of the light with its traveling direction changed by the reflective pattern is emitted from the light exit surface 41.

It is thereby possible to cause the light exit surface 41 to luminously display a drawing pattern corresponding to the arrangement of the reflective patterns by using the light emitted with its traveling direction changed by the plurality of reflective patterns.

The display device 1 is not limited to the aspect of displaying a two-dimensional (2D) image and may be a display device capable of three-dimensional (3D) display.

<Reflective Pattern 10A>

A configuration of a reflective pattern (optical structure) 10A of the embodiment will be described with reference to FIGS. 1(a), 1(b) and 2. The reflective pattern 10A of the embodiment is a concave hollow structure provided on the back surface of the light guide plate 4. Here, in order to facilitate the understanding of the present invention, in the description of FIGS. 1(a) and 2, the reflective pattern 10A is regarded as a convex structure projecting inward from the back surface of the light guide plate 4. In other words, the structure of the reflective pattern 10A when seen from the inside of the light guide plate 4 will be described.

FIG. 1(a) is a plan view illustrating the configuration of the reflective pattern 10A in the embodiment, FIG. 1(b) is a sectional view taken along a line A-A of FIG. 1(a), and FIG. 1(c) is a perspective view illustrating the configuration of the reflective pattern 10A. Here, as described above, it is assumed that the reflective pattern 10A is provided on the back-surface side of the light guide plate 4, the light exit surface 41 side of the light guide plate 4 is upward, and the back-surface side is downward. In FIG. 1(c), the light guide plate 4 is illustrated in a transparent manner, and an outer edge curve 34 illustrated as a relatively sparse dotted line is located closer to the rear side than a reflective surface 20 composed of a top outer edge 23 and an outer edge straight line 24 illustrated as a dense dotted line.

As illustrated in FIGS. 1(a) to 1(c), the reflective pattern 10A in the embodiment has a flat surface, and has the reflective surface (first surface) 20 that is formed of a flat surface and regularly reflects light and a both-end curved surface (second surface) 30 including at each end portion a curved surface 31 having a curved shape. The reflective surface 20 and the both-end curved surface 30 are adjacent to each other.

Assuming that the back surface of the light guide plate 4 on which the reflective pattern 10A is formed is a reference plane 40, the lower side of the reflective pattern 10A (the rear side in a direction perpendicular to the sheet surface of FIG. 1(a)) is an opening formed on the reference plane 40.

The reflective surface 20 is a flat surface inclined at an acute inclination angle with respect to the reference plane 40, and reflects light having entered the light guide plate 4 toward the light exit surface 41 of the light guide plate 4. The reflective surface 20 is made up of the top outer edge (first outer edge) 23 being a ridge line at the top of the reflective pattern 10A, and the outer edge straight line (second outer edge straight line) 24 adjacent to the reference plane 40. Both end portions of the top outer edge 23 are curved. In other words, the top outer edge 23 is formed of: (i) arc-shaped lines rising from both ends of the outer edge straight line 24 in a direction in which the distance between the arc shaped lines becomes shorter; and (ii) a line segment connecting the tips of these two arcs to each other.

The both-end curved surface 30 is adjacent to the reflective surface 20 via the top outer edge 23. The curved surface 31 included in the both-end curved surface 30 is a surface that has a curved shape corresponding to the side surface of a cylinder. For facilitating understanding of the curved surface 31 and the cylinder, here, a method for manufacturing the reflective pattern 10A will be described schematically. The curved surface 31 is formed, for example, as follows.

That is, for example, using a flat end mill, a metal body is processed to produce a casting mold, and electroforming is performed using the produced casting mold, to produce a mold. Injection molding is performed using the produced mold, so that the light guide plate 4 in which the reflective pattern 10A is formed can be obtained. The reflective pattern 10A has substantially the same shape as a recess formed in the casting mold by processing the metal body.

By moving the above flat end mill in a desired direction, (i) the surface corresponding to the reflective surface 21 is formed in the casting mold with the tip side of the cylindrical flat end mill, and (ii) the surfaces corresponding to the curved surfaces 31 at both end portions of the both-end curved surfaces 30 is formed in the casting mold in response to the rotation of the side surface of the flat end mill. That is, the curved surface 31 is a cylindrical surface corresponding to the cylindrical shape of the end mill.

The both-end curved surface 30 has a plane 32 between the curved surface 31 at one end and the curved surface 31 at the other end. The outer edge of the both-end curved surface 30 is made up of: (i) the top outer edge 23, and (ii) the outer edge curve (the outer edge not adjacent to the first surface) 34 that is formed of curves corresponding to the curved surfaces 31 and a straight line corresponding to the plane 32. The outer edge curve 34 is a line segment included in the reference plane 40 and is a line segment having a similar shape to that of the top outer edge 23.

The reference plane 40 can also be expressed as a virtual plane including the outer edge straight line (the outer edge not adjacent to the second surface) 24 and the outer edge curve 34.

Each end portion of the reflective pattern 10A is assumed to be an end portion e. The end portion e is a portion near a vertex v at which the top outer edge 23, the outer edge straight line 24, and the outer edge curve 34 intersect.

Figure 2:
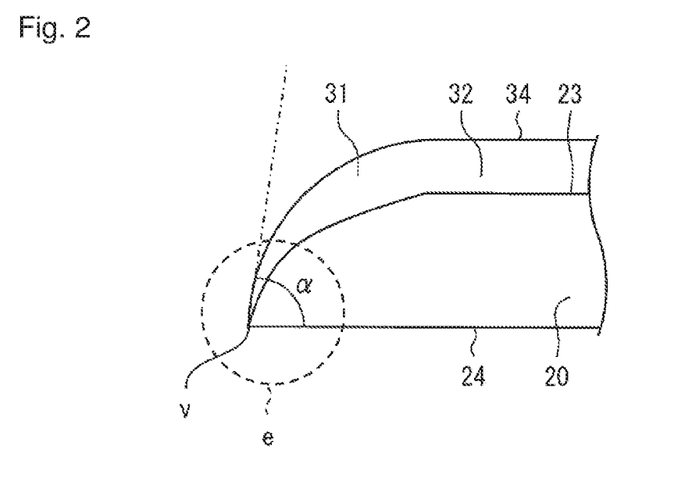
FIG. 2 is an enlarged view of an end portion e.

FIG. 2 is an enlarged view of the end portion e. Here, as described above, when the reflective pattern has a constant pattern depth like, for example, a triangular prism-shaped reflective pattern, the reflective pattern contributes to emit discrete light like, for example, a Bessel function by diffraction. There has thus been a problem of degradation in the optical performance of the reflective pattern.

Therefore, as illustrated in FIG. 2, the present inventors have found that it is possible to reduce the influence of diffraction and improve the optical performance more than conventionally possible by configuring the end portion e of the reflective pattern 10A as follows.

That is, the end portion e has an arc corresponding to the curved surface 31 of the both-end curved surface 30. Here, assuming that the angle between a tangent at the vertex v of the curved surface 31 and the outer edge straight line 24 is α, the angle α is 90 degrees or smaller. Therefore, the length of a perpendicular line (corresponding to the pattern depth) perpendicular to the outer edge straight line 24 in the reflective surface 20 gradually changes due to the arc of the top outer edge 23 of the reflective surface 20 and the curved shape of the curved surface 31 included in the both-end curved surface 30. The discrete degree due to diffraction thus changes, and each light with a different discrete degree overlaps. As a result, the discreteness of the light emitted from the reflective pattern 10A can be relaxed.

Here, a method of changing the pattern depth at a constant rate may also be considered, but as described above, a portion having a small pattern depth is susceptible to diffraction and thus has an extremely large discrete degree. In contrast, the reflective pattern 10A has the arc described above, so that it is possible to reduce the portion having a small depth as much as possible as compared to the case where the depth is changed at a constant rate. Further, the reflective pattern 10A has a shape in which the amount of change in the pattern depth increases with a decrease in the pattern depth.

It is thus possible to reduce the influence of diffraction and improve the optical performance more than conventionally possible.

Further, the reflective pattern 10A according to one aspect of the present invention also exhibits the following effects. That is, when the conventional triangular prism-shaped reflective pattern 130 as illustrated in FIG. 9(b) is formed by injection molding, molding sag may occur on the side surface of the reflective pattern 130. Such molding sag reflects (scatters) light having entered from the side direction of the reflective pattern 130. Here, a case in which light is entered from the side direction of the reflective pattern 130 (the direction perpendicular to the sheet surface in FIG. 9(b)) is a case in which light is transmitted through the reflective pattern 130, that is, light reflected by the reflective pattern 130 is intended not to be emitted from the front surface 123.

A part of the light reflected (scattered) due to the molding sag leaks out of the front surface 123, whereby unintended light emission (noise light) is observed on the front surface 123 side of the light guide plate 120. This can cause degradation in the optical performance of the reflective pattern 130.

Here, as a shape in which the molding sag as described above hardly occurs, there is considered, for example, a trapezoidal prism-shaped reflective pattern 140 as illustrated in FIG. 9(c). In such a trapezoidal prism-shaped reflective pattern 140, projecting ends 142 are present at both ends of a trapezoidal lower base 141, so that the molding sag can be prevented from occurring.

However, in the case of injection-molding the reflective pattern 140, for preventing the occurrence of the molding sag, the base angle of the trapezoidal shape needs to be made small to a certain degree. In this case, a portion with a small distance between the bottom side 143 and the oblique side 144 (a portion susceptible to diffraction) increases. As a result, the influence of the diffraction described above becomes remarkable, and the directivity of the light emitted from the front surface 123 is spread, thus leading to degradation in the optical performance In contrast, the reflective pattern 10A in one aspect of the present invention has an arc corresponding to the curved surface 31 of the both-end curved surface 30 at the end portion e. Further, assuming that the angle between the tangent at the vertex v of the curved surface 31 and the outer edge straight line 24 is a, the angle α is 90 degrees or smaller. Therefore, in the case of forming the reflective pattern 10A by injection molding, the flow of resin can be made smooth by the arc of the top outer edge 23 of the reflective surface 20 and the curved shape of the curved surface 31 included in the both-end curved surface 30. As a result, it is possible to prevent the occurrence of the molding sag during the injection molding of the reflective pattern 10 and prevent the generation of the noise light.

It is thus possible to reduce the generation of the noise light due to the molding sag and the influence of diffraction and improve the optical performance more than conventionally possible.

Modified Example 1

In the first embodiment, as the optical structure in one aspect of the present invention, the reflective pattern 10A formed in the concave shape on the back surface of the light guide plate by injection molding has been described. The optical structure in one aspect of the present invention is not necessarily limited to this. For example, the optical structure may be a concave pattern formed by notching the back surface of the light guide plate. Alternatively, the optical structure may be a convex reflective pattern formed so as to project outward from the light guide plate. The optical structure in one aspect of the present invention is not limited to the configuration provided integrally with the light guide plate but may be attached to the back surface of the light guide plate, for example. In this case, the optical structure in one aspect of the present invention may be made of a material that totally reflects light.

Alternatively, the optical structure according to one aspect of the present invention may be a concave pattern provided on the back surface of the light guide plate, and an exit structure that refracts the light having entered the light guide plate to changes the path of the light. In this case, the refracted light is emitted from the back surface of the light guide plate.

Modified Example 2

The display device 1 in the first embodiment has been a device in which the traveling direction of the light having entered the light guide plate 4 is changed in accordance with the placement and direction of the reflective pattern 10A, and the light is emitted from the light exit surface 41 so that a two-dimensional image or the like is displayed on the light exit surface 41. However, the optical structure, the light guide including the optical structure, and the display device including the light guide according to one aspect of the present invention are not limited to displaying a two-dimensional image or the like.

The display device in one aspect of the present invention may spatially project a three-dimensional image (stereoscopic image). The optical structure in one aspect of the present invention can be applied to, for example, such a display device in which a plurality of reflective patterns are arranged, and an image for the left eye and an image for the right eye are displayed on the light exit surface 41 side of the light guide plate 4 so that the observer can observe a surface image having a stereoscopic effect.

In addition, the display device in one aspect of the present invention may, for example, have a configuration in which a plurality of optical structures reflect or refract image light having entered. The reflected or refracted light is emitted from the light exit surface 41 and forms an image at an imaging point on a plane. Hence, the user can visually recognize an image projected in the air when looking at the virtual plane. The optical structure in one aspect of the present invention can also be applied to such a display device.

In addition, the display device in one aspect of the present invention may be a display device that displays a drawing pattern, a picture, an image, or the like by using the directivity of light emitted from the light guide plate 4.

Specifically, the display device may use the light guide plate to perform display switching of the drawing pattern or a particular appearance expression in which the light emitting state of the drawing pattern is not uniform by using the directivity, or may use the light guide plate to perform binocular or multiple-view stereoscopic display. In addition, as an imaging method in the case of using the light guide plate, a known method can be used.

Second Embodiment

Another embodiment of the present invention will be described with reference to FIGS. 3(*a*) and 3(*b*) and FIGS. 4(*a*) to 4(*c*). Note that configurations except for those to be described in the embodiment are the same as those in the first embodiment. Further, for convenience of description, members having the same functions as the members illustrated in the drawings of the first embodiment will be denoted by the same reference numerals, and the description thereof will be omitted.

There has hitherto been a case where, for example, a concave pattern is formed on the back surface of a light guide plate by using a flat end mill, and a mold for injection molding is manufactured. Here, since the rotational speed of the rotational center of the flat end mill is 0 and the rotational speed near the central axis of rotation is relatively low, the surface to be cut becomes rough and does not become a mirror surface near the central axis of rotation, which has been problematic.

The embodiment has been made in view of the problem as described above, and an object of the embodiment is to provide an optical structure in which the entire first surface can be formed to be a mirror surface and which can further improve the optical performance.

Figure 3:
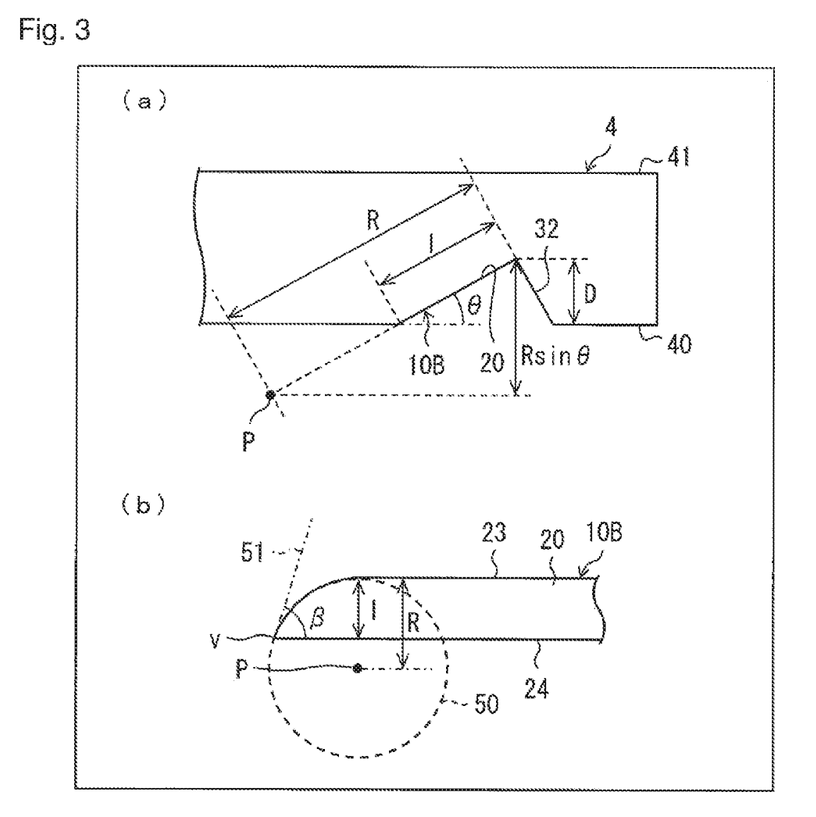
FIG. 3(a) is a sectional view illustrating a reflective pattern in a second embodiment which is formed on the back surface of a light guide plate.
FIG. 3(b) is a view for explaining the shape of the reflective pattern as seen from a direction perpendicular to the surface of the reflective surface.

FIG. 3(*a*) is a sectional view illustrating a reflective pattern 10B in the embodiment which is formed on the back surface of a light guide plate 4, and FIG. 3(*b*) is a view for explaining the shape of the reflective pattern 10B as seen from a direction perpendicular to the surface of a reflective surface 20.

As illustrated in FIGS. 3(*a*) and 3(*b*), the reflective pattern 10B is provided on the back surface (reference plane 40) of the light guide plate 4. Light having entered from the side surface of the light guide plate 4 is regularly reflected by the reflective surface 20 of the reflective pattern 10B and is emitted from a light exit surface 41 of the light guide plate 4.

The maximum value of the distance between the boundary (top outer edge 23) between the reflective surface 20 and a plane 32 included in a both-end curved surface 30 and the reference plane 40 is assumed to be D. The angle between the reflective surface 20 and the reference plane 40 is assumed to be θ. The length of the slope of the reflective surface 20, that is, the maximum value of the distance between a top outer edge 23 and an outer edge straight line 24 on the reflective surface 20 is assumed to be I.

Here, a curved surface 31 of the reflective pattern 10B is a surface having a curved shape corresponding to the side surface of the cylinder, and it is assumed that a radius of a bottom surface 50 of the cylinder is R, and the point of the center of the bottom surface of the cylinder is P. FIGS. 3(*a*) and 3(*b*) illustrate the radius R and the point P. In order to simplify the description, for example, when the back surface of the light guide plate 4 is notched to form the reflective pattern 10B a flat end mill can be used, and the tip end surface of the flat end mill corresponds to the bottom surface of the cylinder.

In the reflective pattern 10B of the embodiment, the following formula (1) is held.

$$D < R \sin \theta \qquad (1).$$

In the reflective pattern 10B of the embodiment, on the other side surface, the maximum value (distance I) of the length of a perpendicular line from a point on a top outer edge (first outer edge) 23 to an outer edge straight line (second outer edge straight line) 24 is shorter than the radius of the bottom surface of the cylinder. That is, the distance I is shorter than the radius R.

In the reflective pattern 10B of the embodiment, on the other side surface, at a point v being an intersection between the top outer edge (first outer edge) 23 and the outer edge straight line (second outer edge straight line) 24, the inclination (angle β) of the tangent line 51 of a curve indicated by the top outer edge 23 with respect to the outer edge straight line 24 is smaller than 90 degrees.

(Method for Manufacturing Reflective Pattern 10B)

Figure 4:
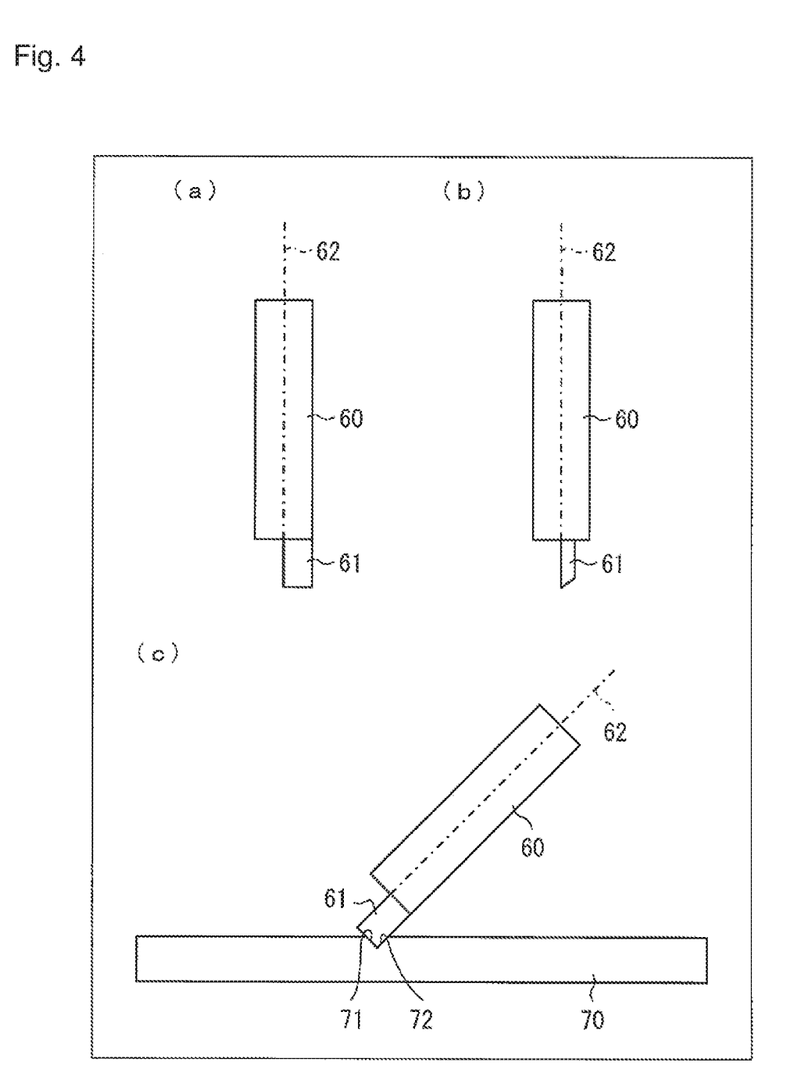
FIG. 4(a) is a front view of a tool used for manufacturing the reflective pattern.
FIG. 4(b) is a side view of the tool.
FIG. 4(c) is a sectional view illustrating a state of manufacturing a casting mold with the tool.

FIG. 4(*a*) is a front view of a tool 60 used for manufacturing the reflective pattern 10B FIG. 4(*b*) is a side view of the tool 60, and FIG. 4(*c*) is a sectional view illustrating the state of manufacturing a casting mold 70 with the tool 60.

The reflective pattern 10B can be manufactured using the flat end mill, but here, the tool 60 with a diamond bar 61 attached to its tip is used. The diamond bar 61 is excellent in sharpness, and by using the diamond bar 61, the processed surface can be mirror-finished more precisely. By rotation of the tool 60 about a central axis 62 of rotation, and the diamond bar 61 thereby rotates to cut an object.

As illustrated in FIG. 4(*c*), the surface of the casting mold 70 is cut such that the central portion (a portion with low rotational speed) of the tool 60 is not used. The plane of the tip of the diamond bar 61 forms an inclined surface 71 corresponding to the reflective surface 20 of the reflective pattern 10B. Further, a locus drawn with the diamond bar 61 when the tool 60 is rotated about the central axis 62 of rotation has a cylindrical shape, and the surface connected by the side surface of the diamond bar 61 forms a surface 72 corresponding to the both-end curved surface 30 of the reflective pattern 10B.

An electroforming process can be performed using the produced casting mold 70 to produce a mold. Then, by injection molding using the mold, it is possible to obtain a light guide plate on which the reflective pattern 10B is formed.

It is also possible to obtain the light guide plate on which the reflective pattern 10B is formed by cutting a resin base material with the tool 60 instead of the casting mold 70.

As thus described, in the reflective pattern 10B of the embodiment, at the time of forming the reflective surface 20 or its mold, a region near the central axis of rotation of the tool 60 is not used. Therefore, the entire reflective surface 20 of the reflective pattern 10B after cutting, or the reflective pattern 10B obtained by injection molding with a casting mold, can be formed to be a mirror surface. This can further improve the optical performance.

In general, polishing a micron-sized pattern is not easy and is time-consuming. In addition, if distortion occurs due to polishing, the polishing needs to be done again.

The entire surface of the reflective pattern 10B in the embodiment can be formed to be a mirror surface. There is no need to form a mirror surface later, thus enabling cost reduction. Also, there is no need to use a special device.

Third Embodiment

Another embodiment of the present invention will be described with reference to FIGS. 5(a) and 5(b). Note that configurations except for those to be described in the embodiment are the same as those in the first and second embodiments. Further, for convenience of description, members having the same functions as the members illustrated in the drawings of the first embodiment will be denoted by the same reference numerals, and the description thereof will be omitted.

In the reflective pattern 10A according to the first embodiment, the both-end curved surface 30 has been made up of the curved surfaces 31 at both end portions and the plane 32 therebetween. A reflective pattern 10C of the embodiment is different from the above in that the curved shapes at both end portions adjacent to each other.

Figure 5:
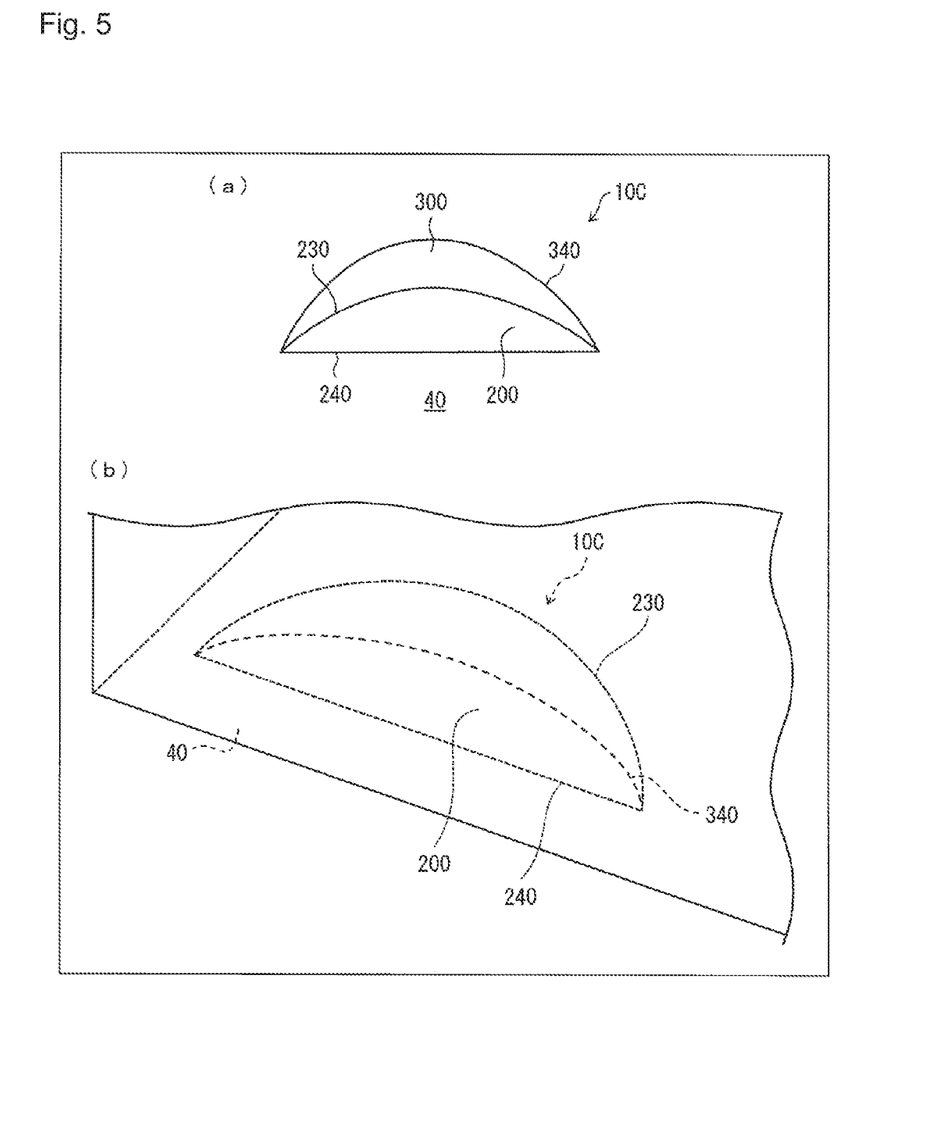
FIG. 5(a) is a plan view illustrating a configuration of a reflective pattern in a third embodiment.
FIG. 5(b) is a perspective view illustrating the configuration of the reflective pattern.

FIG. 5(a) is a plan view illustrating the configuration of the reflective pattern 10C in the embodiment, and FIG. 5(b) is a perspective view illustrating the configuration of the reflective pattern 10C. FIG. 5(b) illustrates the light guide plate 4 in a transparent manner.

As illustrated in FIGS. 5(a) and 5(b), in the reflective pattern 10C of the embodiment, a reflective surface 200 formed of a flat surface is a part of a circle. In addition, the reflective pattern 10C has an overall curved surface 300 in a curved shape, adjacent to the reflective surface 200. The reflective surface 200 and the overall curved surface 300 are adjacent via a top outer edge 230. The outer edge of the reflective surface 200 is formed of a top outer edge 230 and an outer edge straight line 240. The outer edge of the overall curved surface 300 is formed of the top outer edge 230 and an outer edge curve 340. The top outer edge 230 and the outer edge curve 340 have shapes in which the straight portions of the top outer edge 23 and the outer edge curve 34 in the first embodiment have been eliminated, respectively, and are smooth curves.

Such a reflective pattern 10C can be manufactured by cutting without moving the tool 60 in the in-plane direction of the surface of the casting mold 70 in the manufacturing method as described in the second embodiment.

It is thereby possible to achieve the reflective pattern 10C in which the reflective surface 200 is a part of a circle.

Fourth Embodiment

Another embodiment of the present invention will be described with reference to FIG. 7. Note that configurations except for those to be described in the embodiment are the same as those in the first and second embodiments. Further, for convenience of description, members having the same functions as the members illustrated in the drawings of the first embodiment will be denoted by the same reference numerals, and the description thereof will be omitted.

In the reflective pattern 10A according to the first embodiment, the curved surface 31 at each end portion of the both-end curved surface 30 has had the curved shape with a constant curvature, corresponding to the side surface of the cylinder. A reflective pattern 10D of the embodiment is different from the above in that the curved shape is formed of two cylindrical surfaces.

Figure 7:
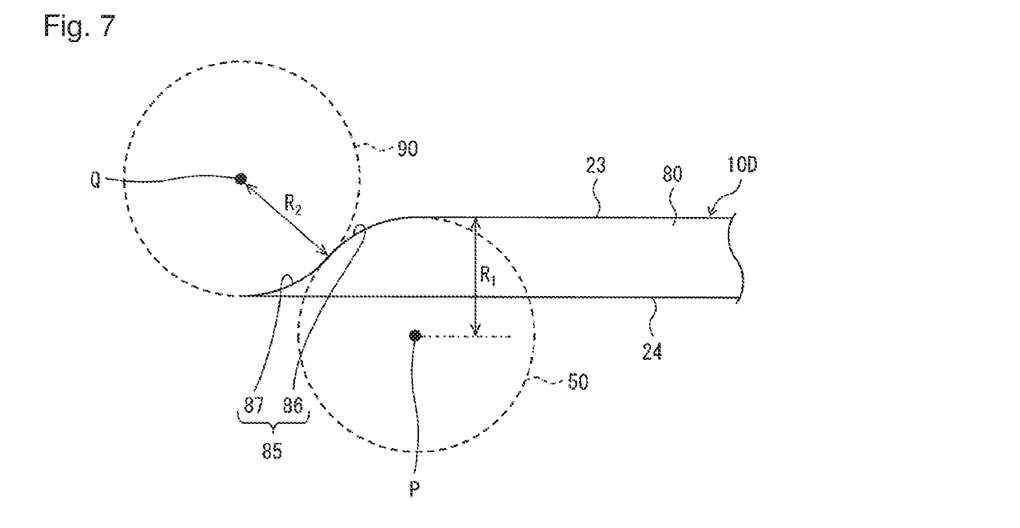
FIG. 7 is a view for explaining a shape of a reflective pattern in a fourth embodiment of the present invention as seen from a direction perpendicular to the surface of a reflective surface.

FIG. 7 is a view for explaining the shape of the reflective pattern 10D in the embodiment and is a view as seen from the direction perpendicular to the surface of a reflective surface 80.

As illustrated in FIG. 7, the reflective pattern 10D of the embodiment is provided with the reflective surface 80 formed of a flat surface, and the curved shape of the curved surface at each end of the reflective pattern 10D is as follows. For convenience of description, the curved shape of the curved surface will be described here based on the shape of a top outer edge 23 when the reflective surface 80 is seen from a direction along a perpendicular line on the reflective surface 80.

The top outer edge 23 corresponding to the portion of the curved surface in the reflective pattern 10D is referred to as a curved outer edge 85. The curved surface in the reflective pattern 10D has a first curved surface and a second curved surface. The curved outer edge 85 is formed of a first curved outer edge 86 corresponding to the first curved surface and a second curved outer edge 87 corresponding to the second curved surface.

The first curved surface is a curved surface corresponding to the side surface of a first cylinder, and the second curved surface is a curved surface corresponding to the side surface of a second cylinder. It is assumed here that the center of a bottom surface 50 of the first cylinder is a point P, the radius of the bottom surface of the first cylinder is $R_1$, the center of a bottom surface 90 of the second cylinder is a point Q, and the radius of the bottom surface of the second cylinder is $R_2$.

The point P and the point Q are located on the mutually opposite sides across the curved outer edge 85 which is the boundary between the reflective surface 80 and the curved surface in the reflective pattern 10D. It can also be said that the curved outer edge 85 is a curve forming a gentle S-shaped curve.

The radius $R_1$ and the radius $R_2$ may be the same value as each other or may be different values from each other.

Such a reflective pattern 10D can be manufactured, for example, as follows: in the manufacturing method as described in the second embodiment, the mold obtained by electroforming after cutting of the casting mold 70 is further processed to obtain a mold, which is then used to perform injection molding.

It is thereby possible to achieve an optical structure in which both end portions of the first surface being a reflective surface have a wavy-shaped curved surface.

As described above, the optical structure according to one aspect of the present invention is an optical structure that changes a traveling direction of light and emits the light, the optical structure including: a first surface formed of a flat surface and configured to change a traveling direction of light; and a second surface formed adjacent to the first surface and having a surface in a curved shape corresponding to a side surface of a cylinder.

Here, when the reflective pattern has a constant pattern depth like, for example, a triangular prism-shaped reflective pattern, the reflective pattern contributes to emit discrete light like, for example, a Bessel function by diffraction.

With the above configuration, the outer edge of the first surface of the optical structure includes the arc corresponding to the curved shape of the second surface. Therefore, the length of the perpendicular line (corresponding to the pattern depth) perpendicular to the base of the first surface gradually changes corresponding to the arc. The discrete degree due to diffraction thus changes, and each light with a different discrete degree overlaps. As a result, the discreteness of the light emitted from the optical structure can be relaxed.

In addition, a reflective pattern having a small pattern depth is susceptible to diffraction, and the discrete degree becomes extremely high. With the above configuration, it is possible to reduce a portion having a small depth as much as possible as compared to a case where the depth is changed at a constant rate. Further, the reflective pattern can be formed in a shape in which the amount of change in the pattern depth increases with a decrease in the pattern depth.

It is thus possible to reduce the influence of diffraction and improve the optical performance more than conventionally possible.

In the optical structure in one aspect of the present invention, incident light is reflected or refracted on the first surface to change a path of the light.

With the above configuration, the light path can be changed with a simple configuration. The optical structure can be, for example, a reflective pattern that is provided in a concave shape on the bottom surface of the light guide, reflects light having entered the light guide, and emits the light from the front-surface side. Alternatively, the optical structure can be a refraction pattern that refracts the light having entered and emits the light from the bottom-surface side. The optical structure can also be provided in a convex shape.

In the optical structure according to one aspect of the present invention, when a virtual plane including an outer edge not adjacent to the second surface, out of outer edges of the first surface, and an outer edge not adjacent to the first surface, out of outer edges of the second surface, is preferably referred to as a reference plane, and assuming that the maximum value of a distance between a boundary of the first surface and the second surface and the reference plane is D, an angle formed by the first surface and the reference plane is 8, and a radius of a bottom surface of the cylinder is R, the following equation (1) is held preferably:

$$D < R \sin \theta \tag{1}.$$

Here, for example, in the case of forming the optical structure on the surface of the light guide by using a flat end mill, or in the case of forming a recess corresponding to the optical structure on the surface of an object to be a casting mold, a radius of a cross section obtained when the cylinder is cut in a plane perpendicular to the long axis of the cylinder is assumed to be R. The radius of the cross section corresponds to the radius R of the bottom surface of the cylinder.

Since the rotational speed near the central axis of rotation of the flat end mill is relatively low, it is difficult to form a mirror surface near the central axis of rotation.

With the above configuration, at the time of forming the first surface or the casting mold thereof, a region near the central axis of rotation of the flat end mill is not used. Therefore, the entire first surface of the optical structure after cutting, or the optical structure obtained by injection molding with a casting mold, can be formed to be a mirror surface. This can further improve the optical performance.

In the optical structure according to one aspect of the present invention, when a virtual plane including an outer edge not adjacent to the second surface, out of outer edges of the first surface, and an outer edge not adjacent to the first surface, out of outer edges of the second surface, is defined as a reference plane, and out of the outer edges of the first surface, an outer edge adjacent to the second surface is a first outer edge and an outer edge adjacent to the reference plane is a second outer edge straight line, it is preferable that the maximum value of a length of a perpendicular line from a point on the first outer edge to the second outer edge straight line be shorter than a radius of a bottom surface of the cylinder.

With the above configuration, the maximum value of the length of the perpendicular line from the point on the first outer edge to the second outer edge straight line is shorter than the radius of the bottom surface of the cylinder. That is, at the time of forming the first surface or the casting mold of the first surface, a region near the central axis of rotation of the flat end mill is not used. Hence, the entire first surface can be formed to be a mirror surface.

In the optical structure according to one aspect of the present invention, when that a virtual plane including an outer edge not adjacent to the second surface, out of outer edges of the first surface, and an outer edge not adjacent to the first surface, out of outer edges of the second surface, is defined as a reference plane, out of the outer edges of the first surface, an outer edge adjacent to the second surface is a first outer edge and an outer edge adjacent to the reference plane is a second outer edge straight line, it is preferable that an inclination of a tangent of a curve indicated by the first outer edge with respect to the second outer edge straight line at an intersection of the first outer edge and the second outer edge straight line be smaller than 90 degrees.

With the above configuration, at the intersection of the first outer edge and the second outer edge straight line, the inclination of the tangent of the curve indicated by the first outer edge with respect to the second outer edge straight line is smaller than 90 degrees. This configuration is achieved by not using the region near the central axis of rotation of the flat end mill at the time of forming the first surface or its casting mold. Hence, the entire first surface can be formed to be a mirror surface.

In the optical structure according to one aspect of the present invention, it is possible that the second surface includes the curved shape at each of both ends, and the two curved shapes are adjacent to each other.

With the above configuration, it is possible to achieve an optical structure in which the first surface being a reflective surface is a part of a circle.

In the optical structure according to one aspect of the present invention, the second surface includes a surface in the curved shape at each of both ends and includes a plane between the surfaces in the curved shape.

With the above configuration, it is possible to achieve an optical structure in which the first surface being a reflective surface is laterally long In the optical structure according to one aspect of the present invention, the curved shape may be formed at each of both ends of the second surface, and each of the curved shapes may have a first curved surface corresponding to a side surface of a first cylinder as the cylinder and a second curved surface corresponding to a side surface of a second cylinder as the cylinder. When the first surface is seen from a direction along a perpendicular line on the first surface, a center of a bottom surface of the first cylinder and a center of a bottom surface of the second cylinder may be located on mutually opposite sides across a boundary of the first surface and the second surface.

With the above configuration, it is possible to achieve an optical structure in which both end portions of the first surface being a reflective surface have a wavy-shaped curved surface.

A display device including a light guide provided with the optical structure described above, and a light source that emits light into the light guide, and a display device that performs display using the directivity of light emitted from the light guide are also included in the technical scope of the present invention.

The present invention is not limited to each of the embodiments described above but can be subjected to a variety of changes in the scope illustrated in the claims. An embodiment obtained by appropriately combining technical units disclosed respectively in different embodiments is also included in a technical scope of the present invention.

DESCRIPTION OF SYMBOLS 1 display device
2a light source
4 light guide plate (light guide)
10A, 10B reflective pattern (optical structure)
20 reflective surface (first surface)
23 top outer edge (first outer edge)
24 outer edge straight line (second outer edge straight line)
30 both-end curved surface (second surface)
31 curved surface (surface in curved shaped)
32 plane
40 reference plane
41 light exit surface
200 reflective surface (first surface)
300 overall curved surface (second surface)

The invention claimed is:

1. An optical structure that changes a traveling direction of light and emits the light, the optical structure comprising:
a first surface formed of a flat surface and configured to change a traveling direction of light; and
a second surface formed adjacent to the first surface and having a surface in a curved shape corresponding to a side surface of a cylinder,
wherein the curved shape is formed at each of both ends of the second surface,
wherein each of the curved shapes has a first curved surface corresponding to a side surface of a first cylinder as the cylinder and a second curved surface corresponding to a side surface of a second cylinder as the cylinder,
wherein when the first surface is seen from a direction along a perpendicular line on the first surface, a center of a bottom surface of the first cylinder and a center of a bottom surface of the second cylinder are located on mutually opposite sides across a boundary of the first surface and the second surface, and
wherein, when
a virtual plane including an outer edge not adjacent to the second surface, out of outer edges of the first surface, and an outer edge not adjacent to the first surface, out of outer edges of the second surface, is defined as a reference plane;
a maximum value of a distance between the reference plane and a boundary of the first surface to the second surface is D;
an angle between the first surface and the reference plane is θ; and
a radius of a bottom surface of the cylinder is R,
the following equation (1) is held:

$$D < R \sin \theta \qquad (1).$$

2. The optical structure according to claim 1, wherein incident light is reflected or refracted on the first surface to change a path of the light.

3. The optical structure according to claim 1, wherein when
a virtual plane including an outer edge not adjacent to the second surface, out of outer edges of the first surface, and an outer edge not adjacent to the first surface, out of outer edges of the second surface, is defined as a reference plane, and
out of the outer edges of the first surface, an outer edge adjacent to the second surface is a first outer edge, and an outer edge adjacent to the reference plane is a second outer edge straight line,
a maximum value of a length of a perpendicular line from a point on the first outer edge to the second outer edge straight line is shorter than a radius of a bottom surface of the cylinder.

4. The optical structure according to claim 1, wherein when
a virtual plane including an outer edge not adjacent to the second surface, out of outer edges of the first surface, and an outer edge not adjacent to the first surface, out of outer edges of the second surface, is defined as a reference plane, and
out of the outer edges of the first surface, an outer edge adjacent to the second surface is a first outer edge, and an outer edge adjacent to the reference plane is a second outer edge straight line,
an inclination of a tangent of a curve indicated by the first outer edge with respect to the second outer edge straight line at an intersection of the first outer edge and the second outer edge straight line is smaller than 90 degrees.

5. The optical structure according to claim 1, wherein the second surface includes the curved shape at each of both ends, and the two curved shapes are adjacent to each other.

6. The optical structure according to claim 1, wherein the second surface includes a surface in the curved shape at each of both ends and includes a plane between the surfaces in the curved shape.

7. A light guide that guides light entering inside and emits a part of the light from a light exit surface, the light guide comprising a plurality of the optical structures according to claim 1.

8. A display device comprising:
the light guide according to claim 7; and
a light source configured to emit light into the light guide.

9. The display device according to claim 8, wherein display is performed using directivity of light emitted from the light guide.

* * * * *